US009458370B2

(12) United States Patent
Brannon et al.

(10) Patent No.: US 9,458,370 B2
(45) Date of Patent: Oct. 4, 2016

(54) METHODS FOR PRE-EMPTIVELY CONTROLLING UNDESIRABLE WATER PRODUCTION FROM AN OIL OR GAS WELL

(75) Inventors: Harold Dean Brannon, Magnolia, TX (US); Leonard John Kalfayan, Cypress, TX (US); Jeffrey Carl Dawson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 902 days.

(21) Appl. No.: 11/866,845

(22) Filed: Oct. 3, 2007

(65) Prior Publication Data
US 2009/0093382 A1 Apr. 9, 2009

(51) Int. Cl.
*C09K 8/035* (2006.01)

(52) U.S. Cl.
CPC ........................... *C09K 8/035* (2013.01)

(58) Field of Classification Search
None
See application file for complete search history.

(56) References Cited

U.S. PATENT DOCUMENTS

| | | | | |
|---|---|---|---|---|
| 3,292,700 | A * | 12/1966 | Berry | 166/284 |
| 4,485,021 | A * | 11/1984 | Purcell et al. | 507/244 |
| 4,515,635 | A * | 5/1985 | Rao et al. | 523/130 |
| 4,555,269 | A * | 11/1985 | Rao et al. | 523/130 |
| 4,580,633 | A | 4/1986 | Watkins et al. | 166/295 |
| 4,699,225 | A * | 10/1987 | Bardoliwalla | 175/72 |
| 4,702,319 | A * | 10/1987 | Bock et al. | 166/275 |
| 4,708,207 | A | 11/1987 | Kalfayan et al. | 166/295 |
| 4,957,166 | A * | 9/1990 | Sydansk | 166/295 |
| 5,379,841 | A | 1/1995 | Pusch et al. | 166/295 |
| 5,418,217 | A | 5/1995 | Hutchins et al. | 507/222 |
| 5,654,261 | A * | 8/1997 | Smith | 507/269 |
| 5,662,168 | A * | 9/1997 | Smith | 166/295 |
| 5,735,349 | A | 4/1998 | Dawson et al. | 166/295 |
| 5,934,373 | A * | 8/1999 | Warpinski et al. | 166/250.1 |
| 5,964,295 | A | 10/1999 | Brown et al. | 166/308 |
| 6,169,058 | B1 | 1/2001 | Le et al. | 507/222 |
| 6,228,812 | B1 | 5/2001 | Dawson et al. | 507/221 |
| 6,395,853 | B1 * | 5/2002 | Oswald et al. | 526/307.2 |
| 7,093,655 | B2 * | 8/2006 | Atkinson | 166/266 |
| 2004/0171495 | A1 * | 9/2004 | Zamora et al. | 507/100 |
| 2004/0177957 | A1 | 9/2004 | Kalfayan et al. | 166/270 |
| 2005/0155796 | A1 * | 7/2005 | Eoff et al. | 175/72 |
| 2006/0019834 | A1 * | 1/2006 | Melbouci et al. | 507/100 |
| 2006/0116296 | A1 * | 6/2006 | Kippie et al. | 507/244 |
| 2007/0281870 | A1 * | 12/2007 | Robb et al. | 507/221 |
| 2008/0070805 | A1 * | 3/2008 | Munoz et al. | 507/110 |

OTHER PUBLICATIONS

Rosen, M.R., "From Treating Solution to Filler Surface and Beyond. The Life History of a Silane Coupling Agent", Journal of Coatings Technology, vol. 50, No. 644, pp. 70-82 (1978).
AquaCon™ Product Information Brochure, BJ Services Company, 2 pages. (Mar. 27, 2003).

* cited by examiner

*Primary Examiner* — John J Figueroa
(74) *Attorney, Agent, or Firm* — John Wilson Jones

(57) ABSTRACT

A method for pre-emptively reducing the production of water in an oil and gas well is provided. In one embodiment, a drill-in fluid having a relative permeability modifier (RPM) capable of impeding the production of water is introduced into the wellbore during drilling operations. In a second embodiment, a completion fluid having a relative permeability modifier (RPM) capable of impeding the production of water is introduced into the wellbore during completion operations. The drill-in fluid or completion fluid may further include an organosilicon compound to increase flow resistance and extend the effective RPM permeability application range.

21 Claims, 2 Drawing Sheets

METHODS FOR PRE-EMPTIVELY CONTROLLING UNDESIRABLE WATER PRODUCTION FROM AN OIL OR GAS WELL

BACKGROUND OF THE INVENTION

This invention relates generally to methods and compositions for modifying the permeability of subterranean formations. In particular, this invention relates to methods and compositions for selectively pre-emptively mitigating unwanted water production prior to its occurrence in oil and gas wells.

Production of water and aqueous fluids from oil and gas wells is a common phenomenon which poses a variety of problems. For example, water production typically reduces the amount of oil and/or gas that may be ultimately recovered from a well since the water takes the place of other fluids that may flow or be lifted from the well. Thus, water production from oil and gas wells causes significant economic drawbacks. High water rates cause a reduction in well productivity and increase in operating expenditures. Furthermore, operating costs associated with disposal of produced water in an environmentally safe manner typically increase with the volume of produced water, thus increasing the threshold amount of hydrocarbons that must be produced in order to continue economical production of the well.

U.S. Pat. No. 6,228,812, which is incorporated herein in its entirety, discloses a chemical treatment that selectively reduces water production. Such treatments employ relative permeability modifiers (RPMs). The use of RPMs offers several advantages. For instance, the use of RPMs reduces costs since the chemicals are used in limited quantities and treatment does not typically require zonal isolation. In addition, the use of RPMs entails low risk since the polymer reduces the water permeability without adversely affecting oil permeability. Further, RPMs are simple to apply and do not require expensive equipment, such as rigs, for their application. It has been observed that suitable RPMs for such chemical treatment applications are homopolymers and copolymers of acrylamide, optionally having been sulfonated or quaternized, polyvinylalcohol, polysiloxane, or a hydrophilic polymer selected from natural gums and chemically modified derivatives thereof.

U.S. patent application Ser. No. 10/386,160, which is incorporated herein in its entirety, also discloses chemical treatment compositions useful for selective permeability modification of subterranean formations. The treatment employs RPM polymers capable of impeding the production of water and an organosilicon compound, the combination acting to substantially reduce the production of water in an oil or gas well without substantially affecting the production of hydrocarbons. The organosilicon compound is believed to attach to the RPM polymer as well as to the mineral surfaces of the formation, thereby increasing flow resistance and extending the effective RPM permeability application range.

Prior art applications of RPMs, as well as RPMs in conjunction with organosilicon compounds, are as water control treatment fluids which may optionally be used as a stimulation fluid. Accordingly, the water control treatment fluids are introduced into the subterranean formation prior to, together with, or following a hydraulic fracturing or other chemical well stimulation treatments. These prior art methods and compositions are relatively non-damaging to oil or gas permeability; for example, in oil saturated sandstone while exhibiting the ability to decrease water permeability substantially in water saturated zones. Therefore, the treatment compositions may be applied successfully to a production zone without the necessity of mechanical isolation in the wellbore, which can add significant costs to a water control treatment.

Although injecting treatment fluids containing RPMs has been effective for controlling unwanted water production, these techniques have been utilized after the problem has occurred. What is needed is a composition and a method for pre-emptively addressing anticipated unwanted water production prior to the occurrence.

SUMMARY OF THE INVENTION

A method for pre-emptively reducing the production of water in an oil and gas well is provided. In one embodiment, a drill-in fluid having a relative permeability modifier (RPM) capable of impeding the production of water is introduced into the wellbore during drilling operations. The concentration of the RPM in the drill-in fluid is between from about 100 ppm to about 80,000 ppm, and preferably between from about 500 ppm to about 20,000 ppm. The RPM has a molecular weight between from about 50,000 to about 20,000,000 g/mole, preferably between from about 100,000 to about 5,000,000 g/mole, and most preferably from about 250,000 to about 2,000,000 g/mole. Furthermore, the RPM may be derived from acrylamide, may be a homopolymer or copolymer of acrylamide which has been sulfonated or quaternized, may be a polyvinyl alcohol or polysiloxane, or may be a hydrophilic polymer selected from natural gums and a chemically modified derivative thereof.

In a second embodiment, a completion fluid having a relative permeability modifier (RPM) capable of impeding the production of water is introduced into the wellbore during completion operations. The concentration of the RPM in the completion fluid is between from about 100 ppm to about 80,000 ppm, and preferably between from about 500 ppm to about 20,000 ppm. The RPM has a molecular weight between from about 50,000 to about 20,000,000 g/mole, preferably between from about 100,000 to about 5,000,000 g/mole, and most preferably from about 250,000 to about 2,000,000 g/mole. Furthermore, the RPM may be derived from acrylamidee, may be a homopolymer or copolymer of acrylamide which has been sulfonated or quaternized, may be a polyvinyl alcohol or polysiloxane, or may be a hydrophilic polymer selected from natural gums and a chemically modified derivative thereof.

The drill-in fluid or completion fluid may further include an organosilicon compound to increase flow resistance and extend the effective RPM permeability application range.

DESCRIPTION OF THE FIGURES

A more complete understanding of the present invention may be obtained with reference to the accompanying drawings.

DETAILED DESCRIPTION OF PRESENT INVENTION

Figure 1:
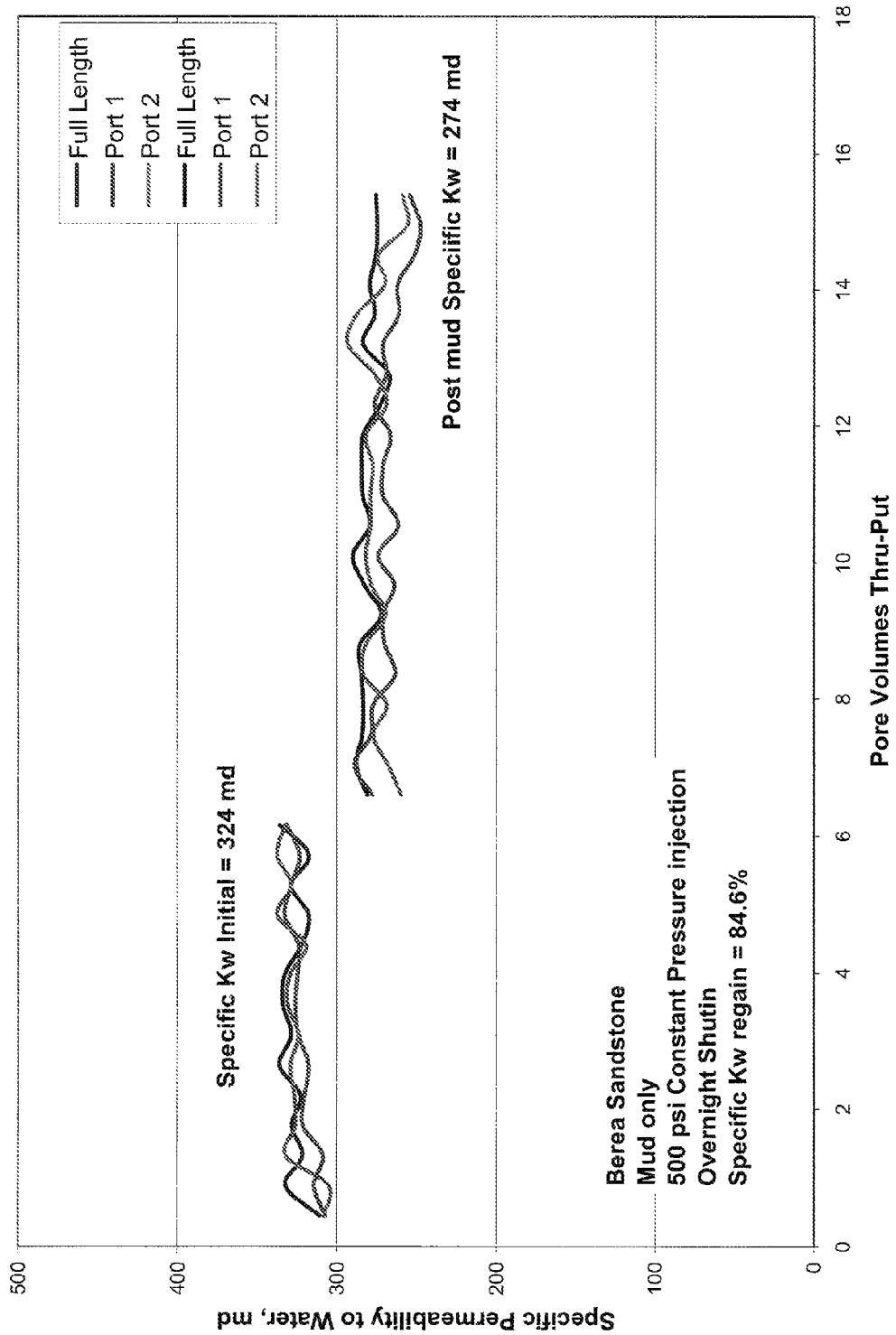
FIG. 1 illustrates permeability results for 2% KCl in a high permeability Berea core obtained after exposure to drilling mud without an RPM.

The compositions and methods described herein may be utilized to pre-emptively mitigate unwanted water production prior to the occurrence in oil and gas wells. According to a preferred embodiment of the present invention, aqueous compositions including relative permeability modifiers (RPMs) are used as additives in the fluid systems used to drill, drill-in, and/or complete hydrocarbon producing intervals of subterranean oil and/or gas wells. One of ordinary skill in the art would also appreciate that additives other than classical RPMs may have utility for pre-emptive water management in a similar manner. Furthermore, one of ordinary skill in the art would also appreciate that the benefits of the present invention are not limited to specific reservoir mineralogies.

Fluids used for drilling into or through the productive formations are typically low viscosity fluids containing various polymers and other additives for bit lubrication and cuttings transport. Due to the hydrostatic pressures involved, some volume of the fluid leaks off to the matrix of the surrounding formation. These polymers are typically too large to negotiate the pore throats of the rock matrix and thus are filtered out onto the formation surface with the filtrate passing into and permeating the matrix. Similarly, completion fluids such as brines often leak off to the formation. Accordingly, the RPM polymers for use with the present invention must be of a sufficiently small hydrodynamic size to flow into and through the rock matrix.

In a preferred embodiment, the aqueous compositions of the present invention contain one or more RPMs. In addition to the size limitation discussed above, the RPM can be any polymer that can impede the production of water. Most often the RPM is hydrophilic having the ability to remain hydrated in the formation waters and simultaneously having an affinity to adsorb onto the solid formation material. It is also desirable for the RPM to be both hydrophilic and lipophobic, selectively decreasing water permeability substantially relative to hydrocarbon permeability, thereby selectively reducing water production while maintaining or enabling an associated relative increase in hydrocarbon production. Such RPMs typically have weight average molecular weights ranging from about 50,000 to about 20,000,000 g/mole, preferably from about 100,000 to about 5,000,000 g/mole, most preferably from about 250,000 to about 2,000,000 g/mole.

If used in conjunction with an organosilicon compound, the RPM must also provide suitable attachment, such as grafting, sites for the organosilicon compound. Most often, interaction of the RPM polymeric material and the silicon-containing organic compound occurs with any oxygen containing pendent group on the polymeric material, particularly the hydroxyl group. However, many of the silicon-based agents are multifunctional having additional functional groups attached to the silicon-based agent. In most cases, these additional groups are generally non-oxygen-bearing groups, but could also interact with specific sites on the RPM. The additional functional groups on the silicon-containing organic compound include amines, isocyanates, amides, thio-based and phosphorus-based groups. These additional functional groups can also interact with the specific sites of the RPM. For example, amine functional groups on the silicon-containing organic compound can interact with polymers having carboxylic acid groups or aldehyde groups to form either amides or Schiff bases. Another example is silicon-based agents having isocyanate or isothiocyanate functional groups that can interact with amine- or alcohol-based RPMs to produce urethane type linkages.

Any RPM that offers an attachment site for the organosilicon compound will provide, to some degree, a favorable response to impede water production and thus be sufficient as the RPM. Suitable RPMs include those referenced in U.S. Pat. Nos. 5,735,349; 6,169,058; and 6,228,812, each of which is incorporated herein by reference.

Suitable RPMs include copolymers of hydrophilic monomers and a second monomer. Hydrophilic monomers may include both ionic and nonionic monomers. The term "nonionic monomer" refers to monomers that do not ionize in aqueous solution at neutral pH. In addition, an anionic monomer, such as salts of acrylates, may be used in conjunction with a cationic monomer. Examples of suitable nonionic hydrophilic monomers include, but are not limited to acrylamide, (meth)acrylamide, N-vinyl pyrrolidone, N-vinyl formamide and N-vinylacetamide. Ionic monomers may be either anionic or cationic. Examples of anionic monomers include, but are not limited to, alkaline salts of acrylic acid, ammonium or alkali salts of acrylamidomethylpropane sulfonic acid ("AMPS"), acrylic acid, (meth) acrylic acid, maleic acid, itaconic acid, styrene sulfonic acid, and vinyl sulfonic acid (or its ammonium or alkali metal salts). Examples of suitable cationic monomers include, but are not limited to, dimethyldiallyl ammonium chloride and quaternary ammonium salt derivatives from acrylamide or acrylic acid such as acrylamidoethyltrimethyl ammonium chloride. Suitable as the second monomer are N-vinylformamide, N-methylacetamide, N,N-diallylacetamide, methylenebisacrylamide or a mixture thereof.

Preferred polymers applicable for use in the present invention as the RPM include homopolymers, copolymers and terpolymers based on acrylamide, particularly those that are sulfonated or quaternized for solubility in high saline formation brines. In a preferred mode, such acrylamide copolymers may contain other components such as acrylic acid or (meth)acrylic acid, or a salt thereof, dimethyldiallylammonium chloride, acrylamidoethyltrimethylammonium chloride, methacrylamidoethyltrimethylam-monium chloride, acrylamidomethylpropanesulfonic acid (AMPS), N-vinyl pyrrolidone, N-vinyl formamide, N-vinyl acetamide, N-vinylmethylacetamide, acrylamidoethyltrimethylammonium chloride, vinyl sulfonic acid, maleic acid, itaconic acid, styrene sulfonic acid, vinylsulfonic acid, methylenebisacrylamide and vinylphosphonic acid and sulfonate monomers thereof.

RPMs may further include homopolymers or copolymers which include the following monomeric units: acrylic acid, (meth)acrylic acid, dimethyldiallylammonium chloride as well as acrylamidoethyltrimethylammonium chloride, methacrylamidoethyltrimethylammonium chloride, acrylamidomethylpropanesulfonic acid (AMPS), N-vinyl pyrolidone, N-vinyl formamide, N-vinyl acetamide, N-vinylmethylacetamide, acrylamido ethyltrimethylammonium chloride, maleic acid, itaconic acid, styrene sulfonic acid, vinylsulfonic acid and vinylphosphonic acid and sulfonate monomers, i.e., those monomers containing $SO_3$ pendant or functional groups and salts thereof, such as those derived with sodium or potassium, or quaternary ammonium salts. The chloride counter ion referenced above may also be substituted, for example, with any other halogen, sulfate, or phosphate. Other suitable monomeric units include dimethyldiallyl ammonium sulfate, methacrylamido propyl trimethyl ammonium bromide, and methacrylmaido propyl trimethyl ammonium bromide.

For example, in one embodiment of the invention, the RPM may include at least one nonionic vinylamide monomer of the formula:

$$CH_2=C(R)—C(O)N(R')_2 \qquad (I)$$

where R and R' independently represent a hydrogen, methyl, ethyl or propyl moiety. In a second embodiment, the RPM may further include at least one monomer containing anionic moieties of the formula:

$$CH_2=CHC(O)X \quad (II)$$

where X represents a moiety containing a carboxylic acid or salt of that acid or a moiety containing a salt of a sulfonic acid or the salt of a sulfuric acid.

Lastly, synthetic polymers based on vinyl acetate to produce polyvinylalcohol (PVA) are also applicable as are polysiloxanes or silicones. The most preferred polymers are PVA having degrees of hydrolysis between from about 50% to about 100% and polyacrylamides as described in U.S. Pat. Nos. 6,228,812 and 5,379,841. In general the silicones are polymers containing the following units:

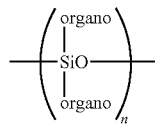

of molecular weight sufficient to afford a viscosity suitable for use in well treatment methods known to those of skill in the art. Generally, the polysiloxanes for use as the RPM have a maximum molecular weight of about 20,000 to about 30,000 or an n value from 2 to about 500, though higher molecular weights may be formed in situ. Preferred polysiloxanes include polysiloxane polyalkyl polyether copolymers. The preferred organo group is a mixture of hydrocarbon such as alkyl and alkoxide and most preferably being methyl and methoxide or ethoxide. Inclusive of preferred polysiloxanes are those of the formula:

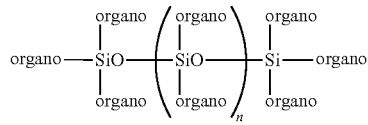

Suitable hydrophilic polymers further include natural gums such as guar, carrageenan, gum Arabic, gum ghatti, karaya, tragacanth, pectin, starch, locust bean gum, scleroglucan, tamarind and xanthan gums and any chemically modified derivatives of these gums including derivatives of cellulose such as the pendent derivatives hydroxyethyl, hydroxypropyl, hydroxypropylcarboxymethyl, hydroxyethylcarboxy-methyl, carboxymethyl or methyl.

In another embodiment of the present invention, the aqueous compositions of the present invention contain one or more RPMs and an organosilicon compound. Organosilicon compounds are generally capable of binding both to the RPM as well as to formation substrate minerals including quartz, clay, chert, shale, silt, zeolite or a combination thereof.

Suitable water-soluble organosilicon compounds for the compositions of the present invention include, without limitation, amino silanes such as 3-aminopropyltriethoxy silane and N-2-aminoethyl-3-aminopropyltrimethoxy silane, and vinyl silane compounds such as vinyl tris-(2-methoxyethoxy)silane. However, as discussed by M. R. Rosen, "From Treating Solution to Filler Surface and Beyond. The Life History of a Silane Coupling Agent," Journal of Coatings Technology, Vol. 50, No. 644, pages 70-82 (1978), many organosilane compounds are water-soluble for prolonged periods of time after they hydrolyze to form silanols, and temperatures can serve to aid the hydrolysis. For purposes of the present invention, then, compounds which form water-soluble silanols by hydrolysis will be considered as equivalent to the originally water-soluble organosilicon compounds. Such organosilicon compounds include organosilane halides and organosilane alkoxides.

Among the organosilanes especially suitable for use in this invention are those organosilane halides of the formula:

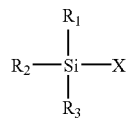

wherein X is a halogen, $R_1$ is an organic radical having from 1 to 50 carbon atoms, and $R_2$ and $R_3$ are the same or different halogens as X or organic radicals of $R_1$. Preferably, X is a halogen selected from the group consisting of chlorine, bromine and iodine with chlorine being preferred, $R_1$ is an alkyl, alkenyl, alkoxide or aryl group having from 1 to 18 carbon atoms and $R_2$ and $R_3$ are the same or different halogens, or alkyl, alkenyl, alkoxide or aryl group having from 1 to 18 carbon atoms. Suitable specific organosilane halides include methyldiethylchlorosilane, dimethyldichlorosilane, methyltrichlorosilane, dimethyldibromosilane, diethyldiiodosilane, dipropyldichlorosilane, dipropyldibromo-silane, butyltrichlorosilane, phenyltribromosilane, diphenyldichlorosilane, tolyltribromo-silane, methylphenyldichlorosilane, propyldimethoxychlorosilane and the like.

Among the organosilane alkoxides suitable for use in this invention are those having the formula:

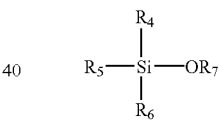

wherein $R_4$, $R_5$, and $R_6$ are independently selected from hydrogen and organic radicals having from 1 to 50 carbon atoms, provided not all of $R_4$, $R_5$, and $R_6$ are hydrogen, and $R_7$ is an organic radical having from 1 to 50 carbon atoms. Preferably, $R_4$, $R_5$, and $R_6$ are independently selected from hydrogen, amine, alkyl, alkenyl, aryl, and carbhydryloxy groups having from 1 to 18 carbon atoms, with at least one of the $R_4$, $R_5$, and $R_6$ groups not being hydrogen, and $R_7$ is selected from amine, alkyl, alkenyl, and aryl groups having from 1 to 18 carbon atoms. When $R_4$, $R_5$, and $R_6$ are carbhydryloxy groups, alkoxy groups are preferred. Suitable specific organosilane alkoxides include methyltriethoxysilane, dimethyldiethoxysilane, methyltrimethoxysilane, divinyl-dimethoxysilane, divinyldi-2-methoxyethoxy silane, di(3-glycidoxypropyl)dimethoxy-silane, vinyltriethoxysilane, vinyltris-2-methoxyethoxysiliane, 3-glycidoxypropyltrimethoxysilane, 3-methacryloxypropyltrimethoxysilane, 2-(3,4-epoxycyclohexyl)ethyl-trimethoxysilane, N-2-aminoethyl-3-propylmethyldimethoxysilane, N-2-aminoethyl-3-propyltrimethoxysilane, N-2-aminoethyl-3-amino-propyltrim-ethoxysilane, 3-amino-propyltriethoxysilane, tetraethoxysilane and the like. The presence of the amine function appears to result in a stronger adsorption of the silane on the formation rock. The resultant polymer renders the treated portion of the formation less oil wet than when a non-amine-containing silane is employed. Thus, in subsequent production of oil through the formation, less oil is retained by the formation and more of the oil is produced.

For purposes of brevity and clarity, the terms "amine," "alkyl," "alkenyl," "aryl," and "carbhydryloxy" have been used above to describe substituents of organosilanes and alkoxides of organosilanes which are useful in the practice of the invention. It is to be understood that these substituents may themselves be substituted or unsubstituted and that each, except for aryl species, may be branched or unbranched.

Such organosilicon compounds are disclosed in U.S. Pat. Nos. 4,580,633 and 4,708,207, each of which is incorporated by reference herein.

When used together, the weight ratio of RPM to organosilicon compound in the aqueous composition is generally from about 3:200 to about 20:4. The weight percentage of the RPM and organosilicon compound composite in the aqueous composition is generally from about 0.01 to about 25 weight percent. For instance, where the RPM polymer is PVA, the concentration ratio in parts per million of PVA RPM polymer to silicon in the organosilicon compound in the aqueous composition is generally from about 20,000:80 to about 200,000:40,000, preferably from about 50,000:800 to about 100,000:4,000. The weight percentage of the PVA RPM and silicon in the organosilicon compound composite in the aqueous composition is generally from about 2.0% to 24.0%, preferably from 5.0% to 10.5%, weight percentage. The concentration ratio in parts per million of polyacrylamide RPM to silicon in the organosilicon compound in the aqueous composition is generally from about 100:80 to about 6,000:40,000, preferably from about 900:800 to about 3,000:4,000. The weight percentage of the polyacrylamide RPM and silicon in the organosilicon compound composite in the aqueous composition is generally from about 0.02% to 4.60%, preferably from 0.17% to 0.70%, weight percent.

In one embodiment, the aqueous composition of the present invention is introduced into the formation as part of an aqueous drill-in fluid or aqueous completion fluid. Such drill-in fluids and completion fluids may be formulated with the aqueous composition of the present invention and an aqueous base fluid. The aqueous base fluid may be any aqueous-base fluid suitable for drill-in and completion fluids known in the art including, but not limited to, fresh water, acidified water having pH range from 1.0 to 3.0, brine, sea water, synthetic brine (such as 2% KCl), produced formation water, etc.

Generally, the disclosed aqueous compositions may be present in the drill-in fluid or completion fluid in any concentration suitable for mitigating water production in a subterranean formation. In one embodiment, the weight percentage of aqueous composition including one or more RPMs is generally about 0.01 to about 15.0 weight percent, preferably 0.1 to 10.0 weight percent. In one embodiment, the one or more RPMs are present in the fluid at a total concentration of from about 500 ppm to about 10,000 ppm polymer, alternatively from about 1000 ppm to about 5,000 ppm polymer, based on the total weight of the drill-in or completion fluid.

Once the drill-in fluid or completion fluid is prepared (either by batch or continuous mixing), the fluid is introduced into the subterranean formation at the production zone in any amount suitable for contacting a portion of a reservoir matrix of flow pathways. By "introduced" it is meant that a fluid may be pumped, injected, poured, released, displaced, spotted, circulated or otherwise placed within a well, wellbore, and/or formation using any suitable manner known in the art. One of skill in the art should appreciate that introduction rates should typically be held below flow rates that would cause pressures to exceed those necessary to fracture the formation. Because the highest leak-off accepting intervals of the production zone are also the most likely to produce water prolifically, they will be more efficiently treated as the greatest volume of leak-off (and thus, the greatest amount of the RPM additive) will be placed in those intervals.

In a preferred embodiment, permeability to water in a subterranean formation may be pre-emptively reduced without substantially reducing permeability to oil in the formation. In this regard, the measure of reduction of permeability of a subterranean formation to a given fluid may be expressed as the resistance factor, $R_f$. For example, the quotient of permeability to water at irreducible oil saturation prior to treatment ($K_{wi}$) to the permeability to water at irreducible oil saturation after treatment ($K_{wf}$) is defined herein as the resistance factor, $R_f$ for water.

The following examples will illustrate the practice of the present invention in its preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

The examples illustrate that the compositions of the invention are highly effective in sandstone formations having absolute permeabilities to brine of 1.0 to 10.0 Darcy in that water flow is significantly reduced in such high permeability sandstone cores. The two examples below are designed to show the improvement of adding RPMs to oilfield drilling fluids. In the first example, a core flow test was conducted on the base drilling mud system in the absence of the RPM. In the second example, the drilling mud also contains the RPM for comparison. As shown below, adding the relative permeability modifier to the mud improves fluid loss control and reduces water production after drilling. Unless specified to the contrary, all percentages herein refer to weight percentages.

Example 1

Drill-In Mud Only

Core flow tests were conducted with Berea sandstone core plug cylinders, measuring 1.5" in diameter and 4.5" in length, having $N_2$ permeabilities of 1000 md. The core plugs were evacuated with air and then saturated with 2% aqueous solution of potassium chloride (KCl). The core was then installed in a hydrostatic core holder apparatus. Approximately 200 psi back pressure was applied at the exit end and approximately 1,000 psi confining stress (overburden pressure) was applied around the entire cylinder. The confining stress pressure simulates stress in the downhole formation. Also, a ⅛" spacer was placed on the core face to allow filter cake build-up. Pressure drop was measured across the entire length of the core as well as through Port 1, located 0.5 cm down from the core face, and Port 2, 5.5 cm from the face. The cell was heated to 150° F. (simulation of the reservoir temperature) and the specific permeability, Kw, using 2%

KCl was measured in both the production and injection directions from each port as the baseline before treatment. Kw was calculated using Darcy's equation for laminar flow through a cylindrical core:

$$k = Q * \mu * L / \Delta P * A \quad \text{(III)}$$

where k=permeability to liquid (Darcies);
Q=rate of flow (ml/sec);
A=Area (cm$^2$);
µ=viscosity (centipoises);
L=length (cm); and
ΔP=pressure differential (atm).

Baker Hughes' (Houston, Tex.) Perf Flow® drilling mud, density 9.5 lb/gal, comprised of sodium chloride, starch, xanthan gum and calcium carbonate powder, was then added to an accumulator and pressured to 500 psi. The core holding cell was opened at both the entry and exit allowing leak-off flow for two hours in the injection direction. Afterward, the exit line was closed, but the 500 psi pressure was maintained for an additional 15 hrs. Next, the accumulator was closed and the pressure in the cell was bled off.

Figure 2:
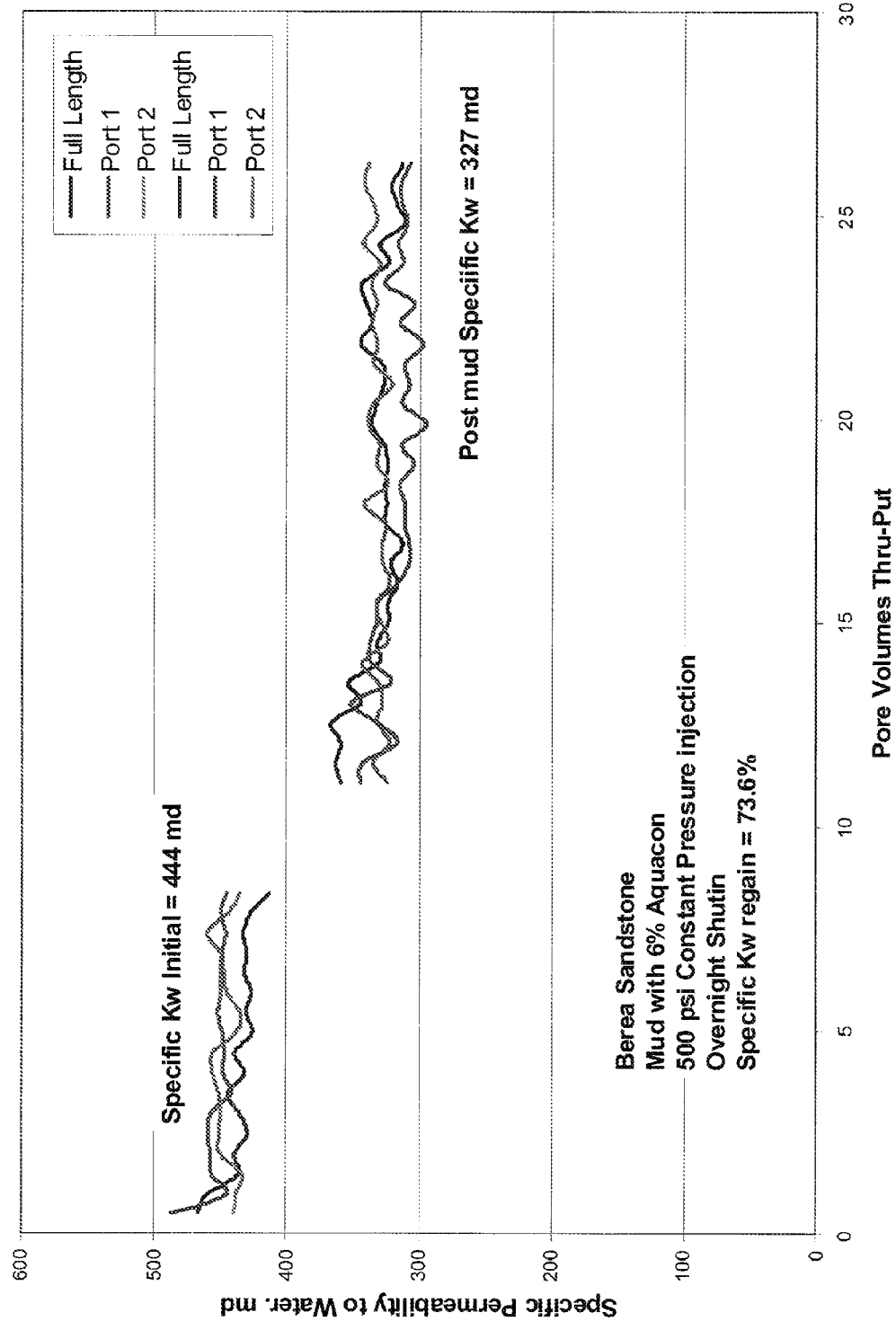
FIG. 2 illustrates permeability results for 2% KCl in a high permeability Berea core obtained after exposure to drilling mud with 6% (vol) AquaCon™, an RPM.

The cell was then re-heated to 150° F. (simulation of the reservoir temperature) and the specific permeability Kw of 2% KCl was measured in both the production and injection directions from each port, as shown in FIG. 2. The time to reach 500 psi in Ports 2 and 3 was 8.5 hrs and the volume of effluent captured by the end of the test was 9 ml. The permeability before treatment was about 324 millidarcy (md) whereas after treatment was 274 md. The reduction contrast, (Permeability before)/(Permeability after) or $R_f$ was 1.18.

Example 2

Drill-In Mud Containing Relative Permeability Modifier

The process in Example 1 was repeated, except in this case, AquaCon™ was added to the Perf Flow drilling mud at a concentration of 6% (vol) of the aqueous AquaCon™ concentrate. AquaCon™, marketed by Baker Hughes Incorporated (Houston, Tex.), is a RPM with a moderate molecular weight hydrophilic ter-polymer based on polyacrylamide, along with sulfonated moieties that enable the polymer to better tolerate brine fluids. The polymer content in the concentrate is 3% (wt) and contains 1% (wt) sodium chloride. Otherwise, the experiment was conducted exactly as was described in Example 1. The pressure port achieved a 500 psi pressure drop in 3.25 hrs suggesting less efficient filter cake, but only 3 ml of effluent were captured at the end of the test, suggesting better fluid loss control. The initial core specific permeability, Kw, was calculated as 444 md, which is higher than the initial core Kw in Example 1. However, the permeability after treatment was 327 md, for a difference in permeability of 117 md. The reduction contrast $R_f$ was 1.36, which is a greater change in permeability than in Example 1 ($R_f$=1.18), suggesting less post water production after drilling.

Results of these core flow screening tests clearly indicate that the composition of the present invention, when utilized with a drilling mud, would effectively pre-emptively reduce relative permeability to water in high permeability sandstones. In light of these results, one of ordinary skill in the art should appreciate that water management treatment placed prior to the onset of unwanted water production may be the most efficient method with respect to life-of-well production management One of ordinary skill in the art would also expect the same results by using the composition of the present invention with a completion fluid. In particular, one would expect similar or greater reduction in water permeability in completion fluid application because the fluid would not contain the number or level of additives that a drilling (or drill-in) fluid may contain that can reduce the degree of adsorption/binding of the composition to the formation pore surfaces. Furthermore, one of ordinary skill would expect that the RPM will more easily enter the rock matrix prior to bonding to the surface due to the absence of the filter cake from the drill-in fluid, thereby providing even better control of encroaching water.

Furthermore, one of ordinary skill in the art would also expect more benefit from addition of an organosilicon compound with the RPM because the addition of an organosilicon compound increases the binding of the RPM near the wellbore and increases "rigidity" of the treatment. The combination of RPM and organosilicon compound (RPM-formation coupling agent) provides a more "severe" treatment, which is more specifically applicable in streaks or portions of the reservoir that are of high permeability from which water production is especially high and into which loss of drilling or completion fluids is high. The organosilicon compound is believed to attach to the RPM polymer as well as to the mineral surfaces of the formation, thereby increasing flow resistance and extending the effective RPM permeability application range. Incorporation of an organosilicon compound with the RPM will thus achieve a preferential (and deeper) treatment in the higher permeability/greater water-producing intervals.

All of the compositions and methods disclosed and claimed herein can be made and executed without undue experimentation in light of the present disclosure. While the compositions and methods of the present invention have been described in terms of preferred embodiments it will be apparent to those of ordinary skill in the art that variations may be applied to the embodiments described herein without departing from the concept and scope of the invention. All such similar substitutes and modifications apparent to those skilled in the art are deemed to be within the scope and concept of the invention.

What is claimed is:

1. A method for pre-emptively reducing the production of water in an oil or gas well, comprising:
    (a) preparing a drill-in fluid comprising a relative permeability modifier (RPM) capable of impeding the production of water;
    (b) circulating the drill-in fluid in the well while drilling through the production zone of a subterranean formation penetrated by the well and flowing the drill-in fluid into the drilled production zone;
    (c) binding the RPM to pore surfaces of the subterranean formation within the drilled production zone and forming a filter cake prior to the onset of water production; and
    (d) reducing water production in the well while maintaining or enabling an increase in the production of hydrocarbons from the well wherein steps (a), (b) and (c) occur prior to producing oil or gas from the well.

2. The method of claim 1, wherein the concentration of the RPM in the drill-in fluid is between from about 100 ppm to about 80,000 ppm.

3. The method of claim 1, wherein the concentration of the RPM in the drill-in fluid is between from about 500 ppm to about 20,000 ppm.

4. The method of claim 1, wherein the formation permeability in the oil or gas well is between from about 0.1 to about 10,000 md.

5. The method of claim 1, wherein the drill-in fluid further comprises an organosilicon compound.

6. The method of claim 1, wherein the RPM has a molecular weight between from about 50,000 to about 20,000,000 g/mole.

7. The method of claim 6, wherein the RPM has a molecular weight between from about 100,000 to about 5,000,000 g/mole.

8. The method of claim 6, wherein the RPM has a molecular weight between from about 250,000 to about 2,000,000 g/mole.

9. The method of claim 1, wherein the RPM is derived from acrylamide.

10. The method of claim 9, wherein the RPM is a homopolymer or copolymer of acrylamide which has been sulfonated or quaternized.

11. The method of claim 7, wherein the RPM is a copolymer of acrylamide and at least one monomer is selected from acrylic acid, (meth)acrylic acid, dimethyldiallylammonium chloride, acrylamidoethyltrimethylammonium chloride, methacrylamidoethyltrimethylammonium chloride, acrylamidomethylpropanesulfonic acid, N-vinyl pyrrolidone, N-vinyl formamide, N-vinyl acetamide, N-vinylmethylacetamide, acrylamidoethyltrimethylammonium chloride, vinyl sulfonic acid, maleic acid, itaconic acid, styrene sulfonic acid, vinylsulfonic acid, methylenebisacrylamide and vinylphosphonic acid and sulfonate monomers thereof.

12. The method of claim 1, wherein the RPM is a polyvinyl alcohol or polysiloxane.

13. The method of claim 12, wherein the polyvinyl alcohol has a degree of hydrolysis between from about 50% to about 100%.

14. The method of claim 1, wherein the RPM is a hydrophilic polymer selected from natural gums and a chemically modified derivative thereof.

15. The method of claim 14, wherein the RPM is guar, carrageenan, gum Arabic, gum ghatti, karaya, tragacanth, pectin, starch, locust bean gum, scleroglucan, tamarind, xanthan gums or a hydroxyethyl, hydroxypropyl, hydroxypropylcarboxymethyl, hydroxyethylcarboxymethyl, carboxymethyl or methyl cellulose derivative.

16. A method for pre-emptively reducing the production of water in an oil or gas well, comprising:
(a) preparing a drill-in fluid comprising a relative permeability modifier (RPM) capable of impeding the production of water;
(b) circulating the drill-in fluid in the well while drilling through the production zone of a subterranean formation penetrated by the well and contacting flow pathways in the subterranean formation in the drilled production zone with the drill-in fluid;
(c) depositing a filter cake at the surface of the production zone of the subterranean formation prior to the onset of water production; and
(d) impeding water production in the well
wherein steps (a), (b), (c) and (d) occur prior to producing oil or gas from the well.

17. The method of claim 16, wherein the concentration of the RPM in the drill-in fluid is between from about 100 ppm to about 80,000 ppm.

18. The method of claim 16, wherein the RPM is a copolymer of acrylamide and at least one monomer is selected from acrylic acid, (meth)acrylic acid, dimethyldiallylammonium chloride, acrylamidoethyltrimethylammonium chloride, methacrylamidoethyltrimethylammonium chloride, acrylamidomethylpropanesulfonic acid, N-vinyl pyrrolidone, N-vinyl formamide, N-vinyl acetamide, N-vinylmethylacetamide, acrylamidoethyltrimethylammonium chloride, vinyl sulfonic acid, maleic acid, itaconic acid, styrene sulfonic acid, vinylsulfonic acid, methylenebisacrylamide and vinylphosphonic acid and sulfonate monomers thereof.

19. The method of claim 16, wherein the RPM is guar, carrageenan, gum Arabic, gum ghatti, karaya, tragacanth, pectin, starch, locust bean gum, scleroglucan, tamarind, xanthan gums or a hydroxyethyl, hydroxypropyl, hydroxypropylcarboxymethyl, hydroxyethylcarboxymethyl, carboxymethyl or methyl cellulose derivative.

20. The method of claim 16, wherein the RPM is a polyvinyl alcohol or polysiloxane.

21. The method of claim 16, wherein the drill-in fluid further comprises an organosilicon compound.

* * * * *